United States Patent
Schmitt et al.

(10) Patent No.: US 12,517,910 B2
(45) Date of Patent: Jan. 6, 2026

(54) METHOD FOR STABLE SET SIMILARITY JOINS

(71) Applicant: Celonis SE, Munich (DE)

(72) Inventors: Daniel Schmitt, Salzburg (AT); Nikolaus Augsten, Salzburg (AT); Daniel Kocher, Eugendorf (AT); Willi Mann, Grünwald (DE); Alexander Miller, Salzburg (AT)

(73) Assignee: CELONIS SE, Munich (DE)

( * ) Notice: Subject to any disclaimer, the term of this patent is extended or adjusted under 35 U.S.C. 154(b) by 0 days.

(21) Appl. No.: 18/860,060

(22) PCT Filed: Apr. 25, 2023

(86) PCT No.: PCT/EP2023/060763
§ 371 (c)(1),
(2) Date: Oct. 25, 2024

(87) PCT Pub. No.: WO2023/208903
PCT Pub. Date: Nov. 2, 2023

(65) Prior Publication Data
US 2025/0284693 A1    Sep. 11, 2025

(30) Foreign Application Priority Data

Apr. 25, 2022  (EP) .................................. 22169764

(51) Int. Cl.
*G06F 15/16*    (2006.01)
*G06F 16/22*    (2019.01)
*G06F 16/2455*  (2019.01)

(52) U.S. Cl.
CPC ...... *G06F 16/2456* (2019.01); *G06F 16/2228* (2019.01)

(58) Field of Classification Search
None
See application file for complete search history.

(56) References Cited

U.S. PATENT DOCUMENTS 11,182,356 B2 *  11/2021  Barber ........................ G06F 7/08
2018/0203917 A1 *  7/2018  Marshall ............... G06F 16/285
(Continued)

OTHER PUBLICATIONS

Yu Chenyun et al: "A Generic Method for Accelerating LSH-Based Similarity Join Processing," IEEE Transactions On Knowledge and Data Engineering, [Online] vol. 29, No. 4, Apr. 1, 2017 (Apr. 1, 2017), pp. 712-726.

*Primary Examiner* — Alex Gofman
(74) *Attorney, Agent, or Firm* — Thomas | Horstemeyer, LLP

(57) ABSTRACT

Provided is a method for the set similarity join, wherein each set represents a process and each token represents a process step. The process comprises a series of process steps executed in at least one source computer system. Hence, similar sets represent similar processes within a collection of processes. The method is based on a two-level signature scheme. Having indexed the sets using a first signature into inverted lists, selected lists, in particular long lists, are reindexed using a second signature. As a result, the number of candidates and thus the number of required distance calculations can be effectively reduced. Its experimental evaluation has shown that the method consistently outperforms state-of-the-art algorithms on datasets with diverging characteristics, suggesting a stable solution for a wide range of applications.

14 Claims, 4 Drawing Sheets

(56) References Cited

U.S. PATENT DOCUMENTS

2024/0176673 A1* 5/2024 Roseberg ........... G06Q 10/0633
2024/0281470 A1* 8/2024 Burckert ............... G06F 16/325

* cited by examiner

METHOD FOR STABLE SET SIMILARITY JOINS

CROSS-REFERENCE TO RELATED APPLICATIONS

This application is a national phase entry of International Patent Application No. PCT/EP2023/060763, filed Apr. 25, 2023, which claims the benefit of EP 22169764.2, filed Apr. 25, 2022, the entire disclosures of which are hereby incorporated herein by reference in their entirety.

FIELD OF THE INVENTION

The invention relates to a method to determine similar sets to a selected query set within a collection of sets, and more generally to the problem of set similarity joins.

BACKGROUND OF THE INVENTION

Thirsting for more information, an ever-increasing amount of data is recorded at present. In order to access the relevant information in datasets, in particular in large datasets, search operations are essential. However, finding exact matches within a dataset is not always sufficient, for instance, when considering spelling or typing errors that frequently occur in text data. Hence, a considerably more practical feature for matching records in a dataset is the similarity operator. The similarity operator finds similar records in the same or two different datasets based on a function that determines the distance between two records.

The set similarity join determines all pairs of similar sets in the same collection of set or from two collection of sets. The set elements are usually called tokens, wherein the tokens in each set are unique. Two sets are similar if the token overlap, i.e., the number of tokens that match in both sets, exceeds a predefined threshold.

The performance of state-of-the-art methods to determine the set similarity join depends substantially on the datasets the method is applied to. Since the characteristics of datasets vary widely, a broad landscape of methods for the set similarity join problem has emerged.

With the Hamming distance chosen for the distance measure, the landscape of known methods for the set similarity join problem can be subdivided into two major groups: The first group comprising methods that operate well in the set similarity join (SSJ) scenario and the second group comprising methods that operate well in the Hamming space join (HSJ) scenario.

Datasets falling into the SSJ scenario are characterized by a large token universe, i.e., a large overall number of unique tokens of the dataset, the sets being broadly distributed in a vector space, and a heavily skewed distribution of tokens with common and uncommon tokens. The methods best suited for the set similarity join problem in the SSJ scenario are typically based on a variation of the prefix filter to prune sets without any token overlap between their prefixes and the prefix of a probing/query set.

Datasets falling into the HSJ scenario, in contrast, are characterized by a small token universe and a substantially uniform token distribution. The second group of methods for the set similarity join problem are typically based on a variation of the partition-enumeration framework by partitioning each set and searching each partition individually using a threshold distance that is smaller than the predefined threshold distance.

Applying a method tailored to the SSJ scenario to a dataset attributed to the HSJ scenario results in severe disadvantages. The prefix filter is based on the assumption that the tokens forming the prefix of a set are uncommon, resulting in many different tokens. For a typical dataset of the HSJ scenario, however, the number of uncommon tokens is limited both due to the small universe size and the more uniform distribution of tokens. Hence, a method of the first group would produce long inverted lists for a dataset of the HSJ scenario such that a large number of candidate verifications are required. Note that each candidate verification involves a distance computation between the candidate set and the probing/query set.

Similarly, applying a method tailored to the HSJ scenario to a dataset attributed to the SSJ scenario is suboptimal. Due to a large universe size of a dataset, query-side enumeration becomes computationally expensive.

In practice, large-scale datasets usually do not belong to their full extent to either one or the other scenario. Hence, any of the known approaches operate at least partially outside of the scenario they are best suited for.

OBJECT OF THE INVENTION

Therefore, it is an object of the present invention to provide a method to solve the set similarity join problem in a more stable and more efficient manner on real-world datasets at large scale, thereby overcoming the before mentioned problems at least partially.

Solution According to the Invention

According to the invention, this object is solved by a method according to the independent claim. Preferred embodiments and further developments of the invention are defined in the dependent claims.

Accordingly, a computer-implemented method to determine at least one similar set to a selected query set within a collection of sets is provided. Note that the method can, of course, also report a null set in case there is no similar set to the selected query set found in the collection of sets.

Each set represents a process and each token represents a process step, wherein the process comprises a series of process steps executed in at least one source computer system.

The method comprises the following steps:
a) determining a first signature for each set;
b) indexing each set based on the determined first signature, wherein each indexed set is stored in at least one first record, wherein each of the at least one first record is recorded in a first data structure representing a first index and corresponds to the determined first signature;
c) selecting a subset of the first data structure based on a predefined cost function;
d) for each first record of the selected subset of the first data structure, determining a second signature for each indexed set;
e) reindexing the indexed set based on the determined second signature, wherein each reindexed indexed set is stored in at least one second record, wherein each of the at least one second record is recorded in a second data structure representing at least one second index and corresponds to the determined second signature;
f) generating a hybrid index from the complement of the selected subset of the first index and the at least one second index; and g) probing at least a subset of the hybrid index by computing a distance value between each set of each record of the subset and the selected query set,
wherein a probed set is identified as one of the at least one similar set if the distance value is smaller or equal to a predefined threshold value.

The at least one similar set represents at least one similar process to a selected process within a collection of processes. In other words, similar sets represent similar processes, in particular process instances (executions of a process), within a collection of processes.

The method according to the invention has the advantage, that the number of required distance calculations in step g) can be effectively reduced. Note that a large number of required distance calculations renders the set similarity join computationally expensive. Therefore, despite an overhead for reindexing a subset of the first index and generating a hybrid index, the runtime and sometimes even the memory usage for the set similarity join on large datasets can be reduced in comparison to methods known from the first group and/or second group outlined above.

The reduction of the number of required distance calculations is achieved by reindexing a subset of the first records of the first data structure into multiple second records of the second data structure. The goal of reindexing a first record of the first data structure is to distribute the indexed sets of the first record into two or more second records of the corresponding second data structure, such that the number of reindexed sets in each of the two or more second records is smaller than the number of sets in the original first record.

The predefined cost function determines which first records of the first data structure to reindex. Based on the characteristics of the second signature, only a subset of the at least one second record of the second data structure eventually remain as (pre-)candidate sets and need to be verified according to step g). In other words, in step g), a number of second records can be sorted out based on the second signature, thereby reducing the number of sets for which a distance to the selected query set is to be calculated in comparison to the number of sets stored in the selected first records of the first data structure. Accordingly, the number of required memory accesses is reduced.

The inventors found that by tuning the predefined cost function and the selection of the first signature and the second signature, a method using this two-level signature scheme for the set similarity join problem outperforms its peers over a wide range of datasets from the SSJ scenario, the HSJ scenario and any mixture thereof. Hence, the two-level signature scheme stabilizes the performance of the set similarity join problem for real-world datasets.

The query set can be selected from the same collection of sets in which similar records are searched or a different collection of sets. The former set similarity join is also called a self-join.

Preferably, the first record of the first data structure is a first linked list and/or the second record of the second data structure is a second linked list. The first linked list and/or the second linked list can be implemented by inverted lists.

The cost function and the second signature can be tuned such that the number of sets stored in a selected first linked list is larger than each of the numbers of sets stored in the second linked lists in step e).

Preferably, the first signature comprises a first prefix, wherein the first prefix comprises at least one token of the corresponding set up to a predefined number of tokens, wherein the predefined number of tokens in the first prefix is computed based on the predefined distance function and the threshold value.

Preferably, the method is repeated, wherein in each repetition a different set of the collection of sets is selected as query set, until all sets of the collection of sets are processed.

In the self-join setting, the repetition of the method for each set of the collection of sets guarantees to find all pairs of similar sets within the collection of sets.

In one embodiment, the first data structure and the second data structure are stored in a volatile memory of the storage device, in particular the main memory.

The selected subset of the first data structure is preferably stored in an allocation data structure, representing an allocation vector. As a result, the selected first records can be processed, in particular merged, before reindexing independently of the complement of the selected subset of the first data structure.

In one embodiment, in step c), the selected subset of the at least one first record is removed from the first index, wherein preferably a corresponding memory space is deallocated.

To clear the first records which are subsequently reindexed using the second signature has the advantage that the memory usage can be reduced. Technically, the first records of the first data structure which are stored in the allocation data structure for reindexing can be deleted from the first data structure.

In one embodiment, in step c), the predefined cost function for each of the at least one first record is computed independently.

Preferably, the predefined cost function contrasts a first cost of probing the indexed 25 sets of one of the at least one first record using the predefined distance function and a second cost of generating the second signatures for the indexed sets, reindexing the indexed sets in order to distribute the number of reindexed indexed sets into the corresponding at least one second record and probing the reindexed indexed sets of the at least one second record, and wherein a first record is selected into the subset 30 if the first cost exceeds the second cost.

Preferably, the indexed sets of the at least one first records are sorted in increasing order of the difference between the first cost and the second cost.

Preferably, in step d), the selected subset of the first data structure is merged before determining the second signature (E2) for each indexed set (I) using any of a group of heuristic methods, the group consisting of:
merging each first record into a common record,
processing each first record separately,
merging each first record into the common record based on a predefined criteria, wherein a first record which fails the predefined criteria is skipped,
merging each first record into at least one merged record based on the predefined criteria, wherein each skipped first record is stored and reassessed in subsequent processing, and
combinations thereof.

The decision of which of the first records of the first data structure are selected for reindexing is NP-hard. Hence, an optimal solution for the cost function to determine which of the first records to select is too difficult to solve in reasonable time. As a result, the inventors established a group of heuristic methods to establish approximate solutions to this NP-hard problem. Each of the heuristic methods is based on a simple decomposition of the first index, wherein a first record either stays in the first data structure or is reindexed into its own corresponding second data structure. However, a simple decomposition can produce a large number of second data structures and high associated reindexing and signature generation costs. Therefore, by merging multiple first records before reindexing these costs can be decreased at the minor expense of possibly higher candidate verification costs due to signature collisions between the second records forming the second indexes.

In one embodiment, in step g), the sets of each record of the subset of the hybrid index are processed with increasing number of tokens.

This processing order allows to apply further filters to reduce the number of distance calculations required in step g).

Preferably, in step g), a predefined length filter is applied according to which each set having a token of its first signature matching a token of the first signature determined for the selected query set is skipped if the matching token is located at a position in the set from which less tokens remain than a predefined lower bound, wherein the predefined lower bound is determined from the predefined threshold value, the size of the selected query set and the position of the matching token in the set.

This enhanced length-filtering has the advantage that sets of the selected subset of the hybrid index can be skipped in a computationally cheaper way than by computing their distance to the selected query set using the predefined distance function.

Preferably, the predefined cost function is based on the predefined length filter, wherein the first signature further comprises the position of the matching token in the set and the number of tokens of the set.

In one embodiment, the first index and the second index are determined using complementary methods, preferably AllPairs and FastCoveringLSH.

The inventors found that it is advantageous if the methods determining the first index and the second index complement each other in terms of performance. In other words, if the first index performs poor on a dataset belonging to the HSJ/SSJ scenario, the second index is built using a method with a better performance on the dataset. Hence, no dataset is handled significantly worse than the best of the first index and the second index. AllPairs uses a comparatively small prefix index but performs well on many real-world datasets. Some datasets with small token universe, however, produce a large number of candidates which have to be verified subsequently. In these cases, using an algorithm designed for the HSJ scenario, such as FastCoveringLSH, is advantageous.

In one embodiment, the predefined distance function determines the Hamming distance. The Hamming distance between two sets is the number of tokens that appear only in one set. Two sets are similar if their Hamming distance is smaller or equal to a given distance threshold.

BRIEF DESCRIPTION OF THE FIGURES

Details and features of the invention as well as concrete embodiments of the invention can be derived from the following description in connection with the drawing, in which.

DETAILED DESCRIPTION OF THE INVENTION

Figure 1:
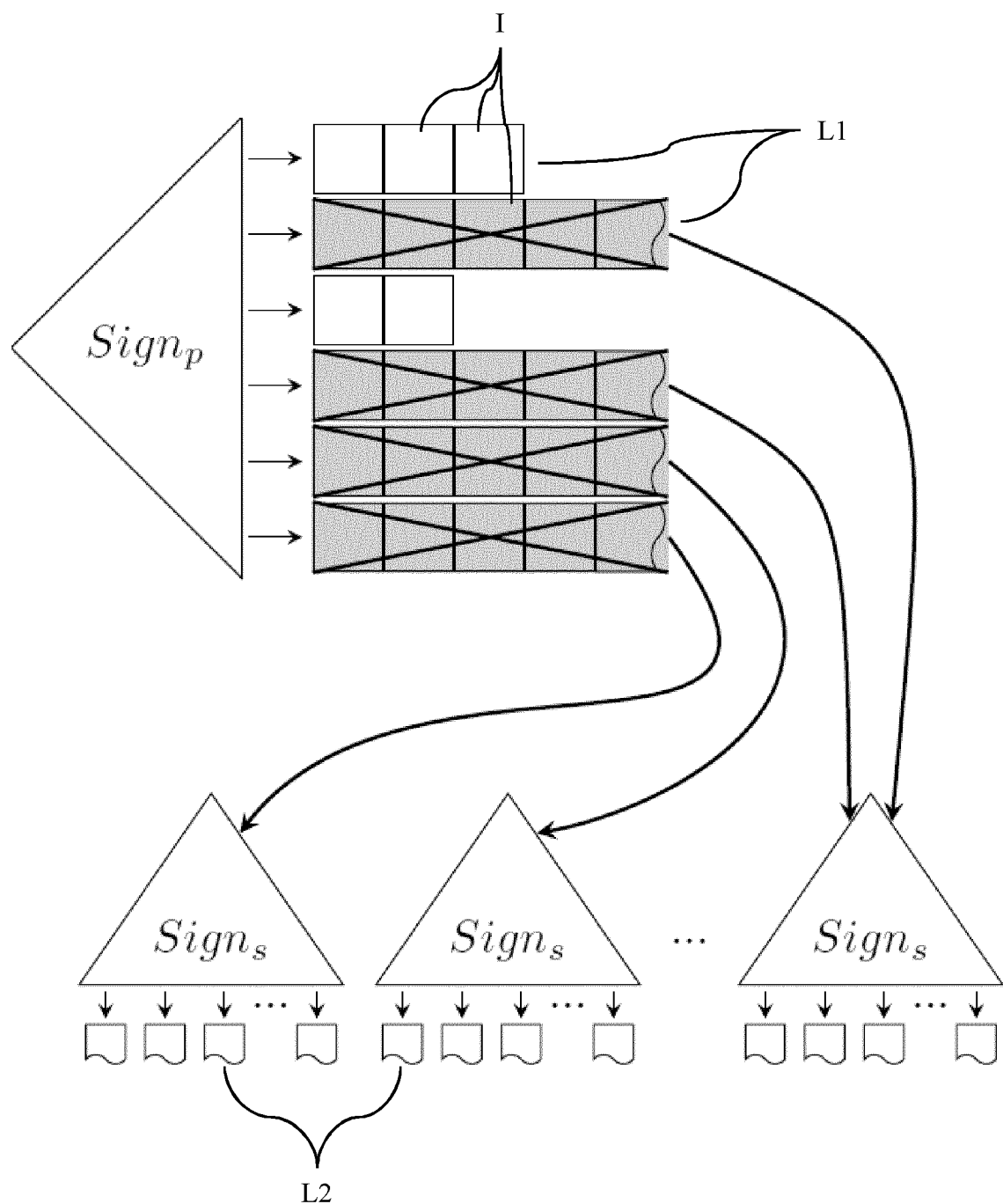
FIG. 1 shows an overview of the two-level signatures scheme according to an embodiment of the invention.

A set similarity join finds all pairs of similar sets P between two collections of sets based on a distance function D and a threshold value T. If the two collections of sets are identical, the set similarity join is called a self-join. In particular, two sets R of a collection of sets are considered similar, if the distance value, which is computed by the distance function D is smaller or equal to a predefined threshold value T, subsequently also labelled as threshold distance c.

In order to determine similarity between two sets R of a collection, a well-defined measure between all sets R in the collection must exist. This measure is given by the predefined distance function D. The distance function D used in the embodiments of the invention described below is the Hamming distance function.

In practice, a set similarity join often serves as a preparatory step for clustering datasets, e.g., using DBSCAN, in various domains. In particular, the set similarity join can be used to determine similar sets in datasets of the domain of process mining. These datasets comprise information about processes which were executed in or with aid of an external computer system.

The data describing these processes is preferably stored in a process protocol from which it can be modeled as sets. The process protocol comprises at least three attributes. A first attribute stores a case, i.e., a process instance. The second attribute stores events, i.e., process steps that form part of the corresponding case. In the third attribute, a sequence of the events, the trace, is stored. For each trace, sets are formed from the transition between the events or activities that belong to a case. For instance, the trace "Start", "Requisition approval", "Quotation", "Order", "reCeipt", "Invoice approval", "Payment" can be modeled using the set $\{(S, R), (R, Q), (Q, O), (O, C), (C, I), (I, P), (P, E)\}$. In doing so, the similarity of two cases, i.e., two traces can be measured using the Hamming distance of the set representation.

The performance of known methods for the set similarity join problem typically differs primarily in the way they generate signatures for each set. A signature is a sort of hash value of a set. In the following, the signature of a set R is also denoted as Sign(R).

The signature scheme has to be generally constructed in such a way that it ensures that any two similar sets share at least one signature. The signature scheme can be symmetric, i.e. the signature of the indexed sets is computed in the same way as the signature of the selected query set Q. The signature scheme can also be asymmetric, i.e. for the selected query set Q a different signature is computed than for the indexed sets. In an asymmetric signature scheme, however, the signatures for the indexed sets and the selected query set Q are related and cannot be constructed independently. To avoid computing the union of the signatures of the indexed sets and the signatures of the selected query set for all pairs, an index is built using the signatures of the sets R.

According to the invention, a first index is generated based on a first signature E1. The first index is subsequently also called primary index. Depending on the first signature scheme and the dataset, some indexing (and querying) signatures can appear more frequently than others. However, common signatures are troublesome, as the number of candidates that must be verified is proportional to the cartesian product of the first inverted lists L1 containing the indexed sets I and the selected query sets Q sharing the corresponding first signature E1 of the first inverted lists L1.

The inventors found that removing those first records L1 of the first data structure comprising a large (inverted) list of indexed sets I with second signatures E2 generated by a different, more selective second signatures scheme can reduce the number of candidates at the cost of additional overhead incurred by cost models, more complex indexing and probing.

FIG. 1 shows a high-level overview of the two-level index structure according to an embodiment of the invention.

The primary index using $Sign_p$ has some long inverted lists L1 comprising a number of indexed sets I. Those lists are reindexed into multiple secondary indexes using the second signature scheme $Sign_s$. Afterwards, the lists L1 of the primary index that were reindexed can be removed.

The classic join algorithm of the filter-verification approach follows three steps: (1) Returning a set of pre-candidates from an index look-up; (2) De-duplicating and filtering the pre-candidates; (3) Verifying the resulting candidate pairs and generating the final result.

According to the invention, instead of filtering pre-candidates of long first inverted lists L1, the two-level signature approach reindexes selected first inverted lists L1 into their own second index. It was shown by the inventors that despite an overhead cost for reindexing the selected first inverted lists L1 occurs, the overall number of candidates to be verified can be reduced such that the overall runtime and sometimes even memory usage of the set similarity join improves significantly over a wide range of datasets from various domains.

In order to achieve this significant performance optimization, two questions need to be answered after having established the first index: (1.) Which first inverted list L1 to reindex?(2.) Which second signature scheme to use?

Figure 2:
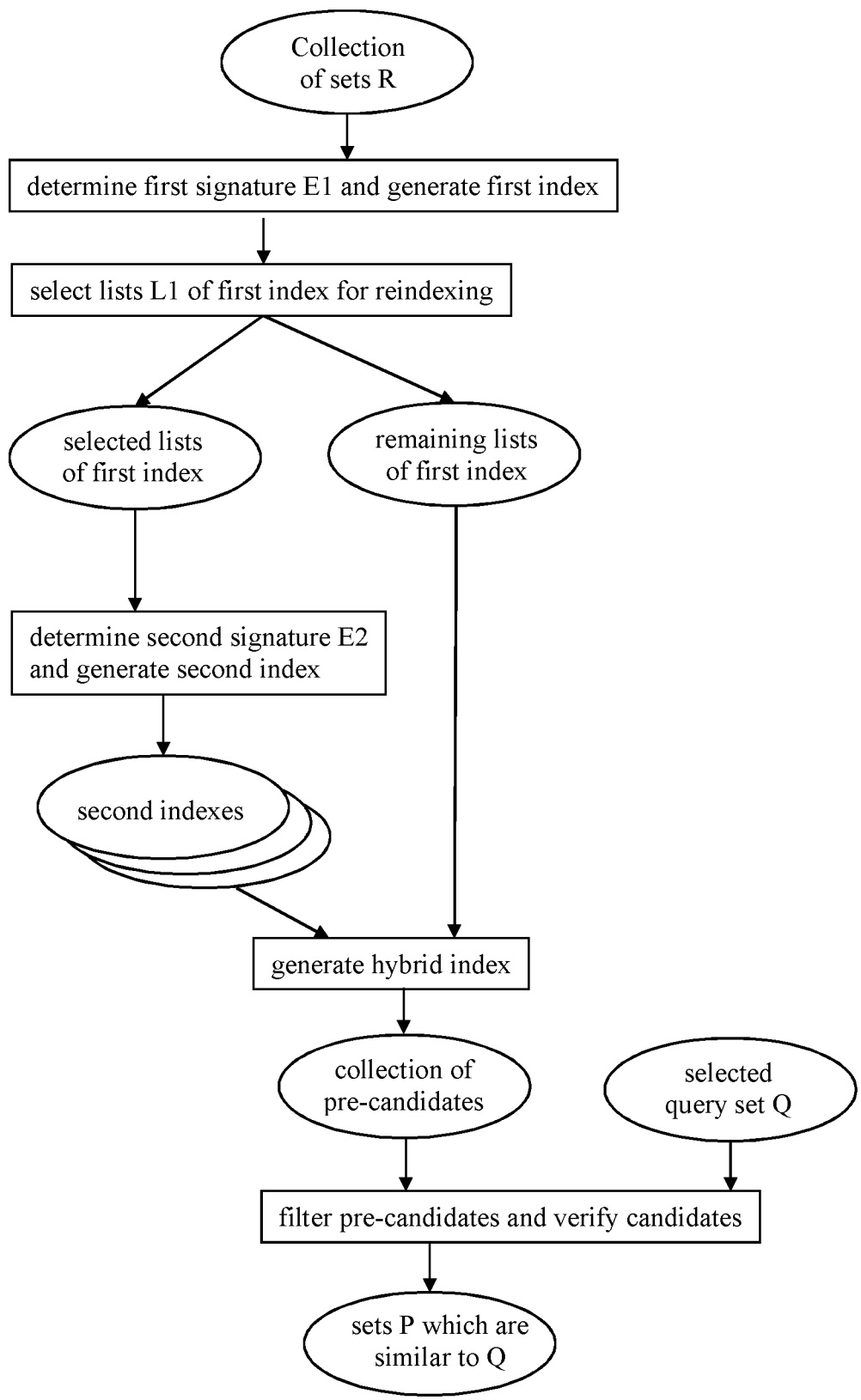
FIG. 2 shows a flow chart of an embodiment of the method according to the invention.

FIG. 2 shows a flow chart of an embodiment of a method according to the invention.

To determine similar sets to a selected query set Q in a collection of sets R, wherein the query set Q may be selected from the same collection of sets R or any second collection of sets, the collection of sets R is first indexed. The first index for the collection of sets R is generated based on a first signature E1.

The first signature E1 may be for instance a prefix. The prefix is defined as the first predetermined number of tokens in the ordered sets of the collection of sets R, wherein the predefined number typically depends on the set size and the used similarity function D or dissimilarity distance.

The first index comprises a number of first records L1, wherein the first records L1 are typically represented by inverted lists L1, i.e., lists L1 that are linked to a unique token of the token universe spanned by the first signatures E1 (prefixes).

In practice, in particular for datasets comprising a small and/or skewed token universe, some of the lists L1 grow very long. Thus, long inverted lists L1 comprise many sets which are considered pre-candidates and need to be verified using the predefined distance function D.

Advanced methods for the set similarity join problem typically aim at reducing the number of sets comprised in the inverted lists using sophisticated filter techniques, often adapted to certain characteristics of datasets. However, the inventors found that the overall number of pre-candidates can be reduced even by breaking down the long-inverted lists of the first index into multiple new lists of a second index using a second, preferably opposed signature scheme. Despite selecting which long-inverted lists to reindex and respective reindexing cost additional performance and memory, the reduction in the overall number of pre-candidates turned out to be so effective that the overall performance and sometimes even memory costs are reduced in comparison to known (advanced) methods for the set similarity join problem.

According to an embodiment of the invention, the lists L1 of the first index are separated into two classes: A first class of selected lists which are considered for reindexing and a complementary second class of lists which remain as is in the first data structure. The decision of which lists L1 to reindex is based on the result of a predefined cost function.

The predefined cost function evaluates a first cost, a second cost and the difference between the first cost and the second cost. The first cost represents the standalone cost for determining similar sets in a selected long inverted list L1 for the selected query set Q. The second cost estimates the standalone cost for determining similar sets in case the selected long inverted list L1 is reindexed. Therefore, inverted lists L1 are only considered reindexable if the first cost exceeds the second cost. As the pre-candidates of the second index form a subset of the primary index in terms of standalone costs, this condition typically only occurs if the cost of generating the second signatures E2 and reindexing outweighs the benefit of fewer verifications. The result of this step is a simple decomposition, wherein inverted list L1 either stays in the primary/first index or is reindexed into its own secondary/second index. In other words, for each list L1 of the first data structure which is considered reindexable an own second data structure is generated comprising two or more second records L2, i.e., inverted lists L2 of which each is shorter than the original inverted list L1 of the first index.

Next, a hybrid index H is generated from the multiple second indexes and the remaining first records L1 of the first index.

The inventors propose for approaches to merge first records prior to reindexing. Depending on the structure of the resulting second indexes, a merge can reduce the overall verification costs. All of the four approaches start with a simple decomposition as described above. This simple decomposition of the selected long-inverted lists L1 of the first index can be enhanced in two dimensions:

(1) Accessing the projected costs for every merge of first records L1, a so-called Δ-check, which ensures that the costs cannot grow upon merging two first records. On the other hand, calculating the projected costs increases the cost model overhead such that in case almost all merges of the selected first records L1 are beneficial, omitting the Δ-check can improve the efficiency of the method.

(2) Using multiple second indexes can increase the memory usage of the method as some indexed sets I might have to be duplicated in multiple second indexes. Restricting multiple indexes, however, can result in a large second index comprising common second signatures E2 which lock other selected first records L1 from being merged due to a large projected cost (i.e., a low benefit of merging) thus failing the Δ-check.

The four approaches for merging first records L1 of the selected subset of the first data structure result from all four possible combinations.

In any case, the inverted lists L1 of the first index are initially sorted in decreasing order of their difference in the first cost and the second cost. In the course of reindexing, the first records L1 of the selected subset of the first data structure are merged using any of a group of heuristic methods.

One of this group is the SingleSimple method, according to which all selected lists L1 of the first index are merged into a common record and reindexed into the same second index. This approach works well under the assumption that the sum over the benefits of the reindexed lists L2 is large compared to the number of collisions between the lists L2 of the second index. This condition can occur, e.g., if a pure secondary index similarly outperforms the primary index.

Another method of the group of heuristic methods, MultiSimple, uses the initial simple decomposition as its second index without accessing any projected costs.

Hence, these two simple approaches work without reassessing any of the first records L1 as processing along the first data structure. The difference in resulting computational cost is modeled by way of a basic example.

In this example the collection of sets $R=\{s1, \ldots, s18\}$ is considered to comprise four lists in its first index. These four lists are summarized in Table 1. The secondary signature scheme is given by its preimages, which is summarized in Table 2 below.

For simplicity, we assume symmetric signature schemes, wherein the verification cost of the first index equals the verification cost of the second index and the index generating cost for the second index and equals one. All other costs are set to zero. In this example, every inverted list IL1 to IL4 is considered reindexable in a second index. The first costs of the inverted lists of the first index are also summarized in Table 1. For the first list IL1 the first cost is calculated as 45 and the indexing verification costs of the corresponding second index as 20 and 10, respectively, i.e., the second cost equals 30. All other lists have a first cost of 6 and a second cost of 5 due to an indexing cost of 4 and a verification cost of 1.

TABLE 1

First records of the first data structure generated for the exemplary collection of sets R.

| ID | First record | Primary standalone cost | Secondary standalone cost |
|---|---|---|---|
| IL1 | $\{s1, s2, \ldots, s10\}$ | 45 | 30 |
| IL2 | $\{s11, s12, s13, s14\}$ | 6 | 5 |
| IL3 | $\{s15, s16, s17, s18\}$ | 6 | 5 |
| IL4 | $\{s1, s6, s13, s14\}$ | 6 | 5 |

TABLE 2

Second records generated on basis of the second signature scheme for the exemplary collection of sets R.

| ID | Second record |
|---|---|
| SR1 | $\{s1, \ldots, s5, s11\}$ |
| SR2 | $\{s6, \ldots, s10, s15\}$ |
| SR3 | $\{s12\}$ |
| SR4 | $\{s16\}$ |
| SR5 | $\{s13, s14\}$ |
| SR6 | $\{s17, s18\}$ |

In the SingleSimple approach, the lists IL1 to IL4 are merged into a common record prior to indexing the common record into the same second index. This approach results in total costs of 50 (32+18).

In the MultiSimple approach, all inverted lists are indexed inside their own second index. The total cost thus summarizes to 45 (30+5+5+5).

Two further methods of the group of heuristic methods follow a reassessment strategy. In short, the reassessment-based approaches follow the same patterns as their simple counter parts, but perform the Δ-check before merging two first records. In other words, merging two first records is performed on basis of a predefined criteria.

The SingleReassessment method processes through the inverted lists L1 of the first index in decreasing order of the difference between the first cost and the second cost. In other words, the list L1 with the highest difference between the first cost and the second cost is picked first and for every following list, the list is merged if it passes the Δ-check, otherwise the list is skipped.

Projected onto the examples introduced above, SingleReassessment begins with IL1. The costs of generating the second index for IL1 are 30, as it only contains IL1. Before adding the second list IL2, the Δ-check is performed. As Δ equals 5, the list is skipped. The third list IL3 is skipped for the same reason. For IL4, Δ equals −2 such that the second index is built using the union of the first list IL1 and the fourth list IL4. The total costs therefore are 45 (33+6+6).

For MultiReassessment, the processing proceeds like in SingleReassessment, however, the skipped lists are stored. After a first iteration through the reindexable lists L1 of the first index, a second iteration through the skipped lists is performed. That is, the first skipped list is processed and merged with following skipped lists using the MultiReassessment strategy. This procedure is repeated until all reindexable lists L1 are indexed into a second index. Using MultiReassessment, two or more second indexes can be built. A resulting second index can be seen as a left-deep tree, where all Δ-checks have succeeded. By building left-deep trees, the second index can be built using only linear additional memory, as only one second index is built at a time.

With respect to above example, the MultiReassessment approach begins with the first list IL1. As in SingleReassessment, the lists IL2, IL3 are skipped and IL4 is merged with IL1 into a merged list. Next, a Δ-check is performed on IL2 and IL3, which were skipped in the first iteration. As the second signatures of the sets in IL2 and IL3 are disjoined, Δ equals zero and the indexes can be merged. The total costs thus summarize to 43 (33+10). Hence, the MultiReassessment strategy requires the lowest costs in this basic example.

Upon generating the hybrid index H, the collection of pre-candidates can be further filtered before verifying the candidates against the selected query set Q.

In addition to a prefix filter and a length filter, preferably a two-sided variation of the position-enhanced length filter is applied. The positional filter enhances the prefix filter in that it utilizes positional information of tokens to further reduce the number of pre-candidates. The key idea is to find an overlapping token in their prefixes E1 of the probing set Q and a set R of the hybrid index and to validate whether the remaining number of tokens can still reach the minimum required amount of overlap to consider the two sets Q, R similar. In case the remaining number of tokens cannot reach the minimum required amount of overlap, the corresponding set R of the hybrid index can be safely pruned.

In other words, the positional filter uses the position of a first matching token in the probing set R to find an upper bound for the length of the selected query set Q. If the position of the corresponding token was known for the selected query set Q as well, a tighter lower bound could be derived and predefined exactly like the upper bound. For instance, the lower bound $l_{min}$ can be determined using the formula $$l_{min} = |R| + 2p_s - \epsilon,$$

wherein |R| denotes the length of the set R, $p_s$ the position of the first matching token in the selected query set Q and $\epsilon$ the predefined threshold distance.

Introducing such a lower bound for the positional filter comes with certain advantage in particular when the set similarity is tested for a collection of query sets Q: As datasets are usually processed in increasing size of the sets R, the lower bound grows monotonically. Hence, if an index entry is skipped once due to the lower bound, it will be skipped by all further applications of their positional filter and a monotonically increasing offset for the first non-failing set of every group can be used and updated while probing. After failing the upper bound for the first time, the rest of the group with the same position can be skipped.

Further, an embodiment of the invention, herein denoted TwoL, is compared with known approaches for the set similarity join problem using Hamming distance as measure of the similarity.

The known methods used for this comparison are:

GroupJoin, which is a prefix-filter based set similarity join algorithm extending PPJoin. Sets with the same prefix are grouped to allow faster filtering, the groups are expanded during verification.

SizeAware, which is a set similarity join algorithm focused on the overlap as its measure of similarity. The dataset is split into short and long sets. Long sets are processed using any algorithm, e.g., ScanCount. For a predefined size of an overlap, small sets are processed by enumerating all subsets of the predefined size and storing the sets in inverted lists indexed by these subsets.

AllPairs, which was the first main memory algorithm to use the prefix filter. Further, filter enhancement is achieved by using the length filter.

PartAlloc, which is based on the partition-enumeration framework. Each set is partitioned into a predefined number of parts and for each part all dimension deletion variance enumerated. An inverted list index is built for the partitions and the deletions. While probing, a cost model is used for each partition to decide whether or not to probe the partition, or probe the deletions.

fcLSH, which is the fast-covering LSH method based on a set of bitmasks and the corresponding hash functions.

SkipJoin, which is a prefix-filter based set similarity join algorithm that implements two skipping techniques:

(1) Index-level skipping groups index entries into skippable blocks based on the positional filter.

(2) Answer-level skipping leverages the similarity of the probed set to an indexed set to find other sets that are similar to the indexed set. The choice of computing the candidates of the indexed set from scratch vs. leveraging the similarity of the probed set to the indexed set is based on a cost model.

Figure 3:
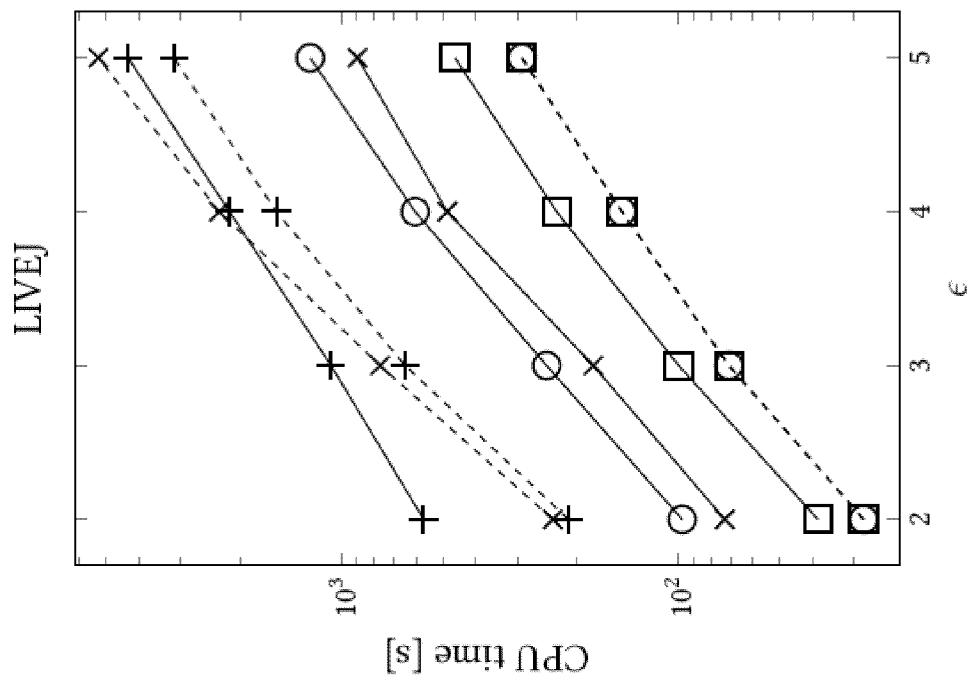
FIG. 3 shows a comparison of the runtime for different threshold distances between an embodiment of the method according to the invention and known methods of prior art for datasets of the SSJ scenario and the HSJ scenario.
Figure 3:
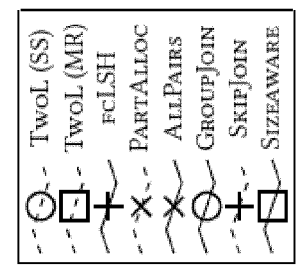
Figure 3:
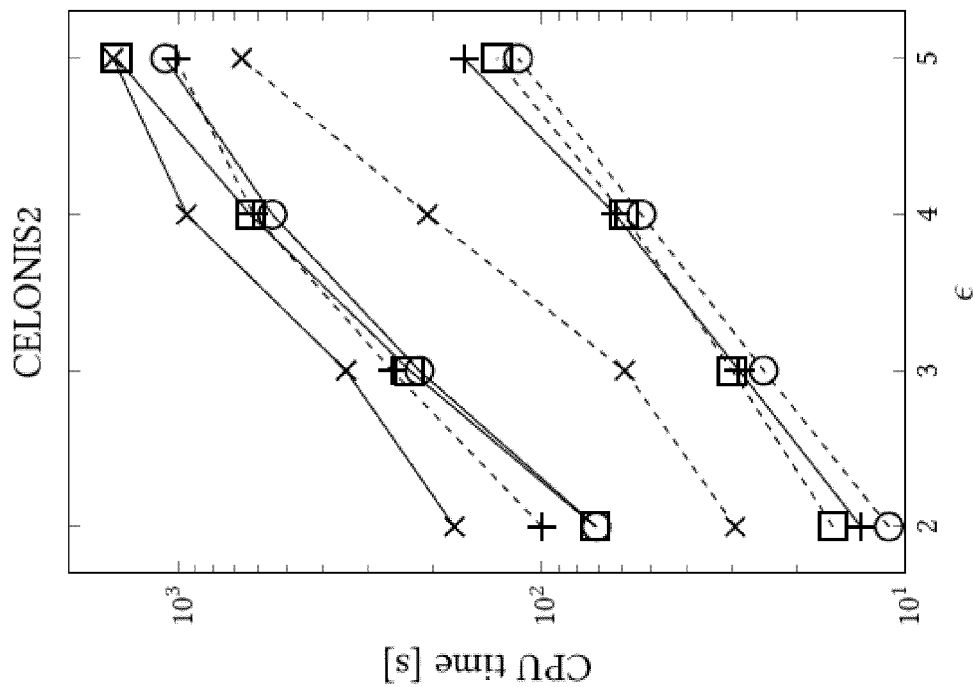

FIG. 3 shows a comparison of the runtime for different threshold distances between two embodiments of the invention and the methods known of prior art mentioned above.

The runtime efficiency depicted in FIG. 3 is measured as the overall runtime, i.e., the time to enumerate all pairs of similar sets, excluding the time to load the dataset or perform typical preprocessing steps like tokenization, sorting and deduplication. The algorithms were run for varying threshold distances c ranging from 2 to 5. The embodiments of the invention which are compared to known methods of prior art are based on the SingleSimple approach (labeled SS) and the MultiReassessment approach (labeled MR).

The datasets on which the algorithms are compared are labeled CELONIS2 and LIVEJ.

CELONIS2 is a dataset from the domain of process mining and models processes. A set in CELONIS2 consists of the activity transitions of a trace, i.e., the sequence of process steps. Compared to typical set similarity join datasets, CELONIS2 has a small token universe.

LIVEJ is a typical set similarity join dataset comprising a large token universe that is further highly skewed. Hence, compared to a LIVEJ, the CELONIS2 dataset is an interesting edge case, where an immediate categorization into SSJ vs. HSJ does not seem obvious.

For both datasets, the two embodiments according to the invention deliver the best runtime efficiencies over the entire range of distance thresholds tested. Note the logarithmic scale of the y-axis. In the case of the CELONIS2 dataset, only the fcLSH dataset delivers a comparable runtime efficiency as the two embodiments according to the invention. In particular the SingleSimple approach delivers the best runtime experience for the CELONIS2 dataset. Remarkably, the embodiments according to the invention outperform state-of-the-art method such as AllPairs by a full order of magnitude. This observation also holds for the LIVEJ dataset.

For the LIVEJ dataset, the two methods according to the invention outperform their peers clearly, while there is no notable difference between the SingleSimple and the MultiReassessment approaches in this case. Thus, the two-level signature approach according to the invention does not only ameliorate the runtime efficiency on datasets that are stereotypical for similarity joins, however, also on real-world datasets which put a strong challenge on previously known methods for the set similarity join problem.

Figure 4:
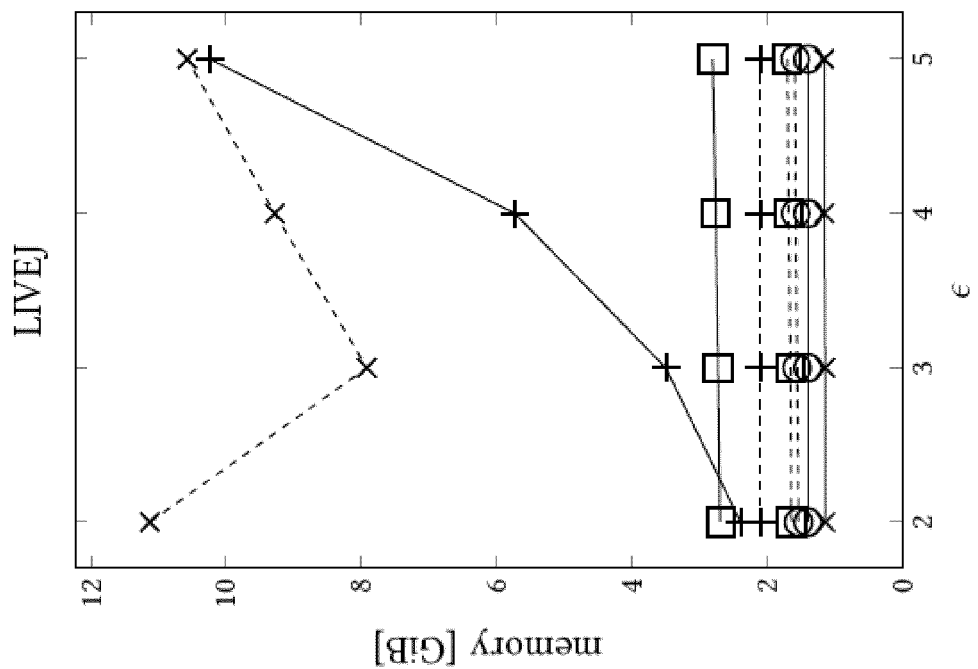
FIG. 4 shows a comparison of the memory consumption for different threshold distances of an embodiment of the method according to the invention and known methods from prior art on datasets of the SSJ scenario and the HSJ scenario.
Figure 4:
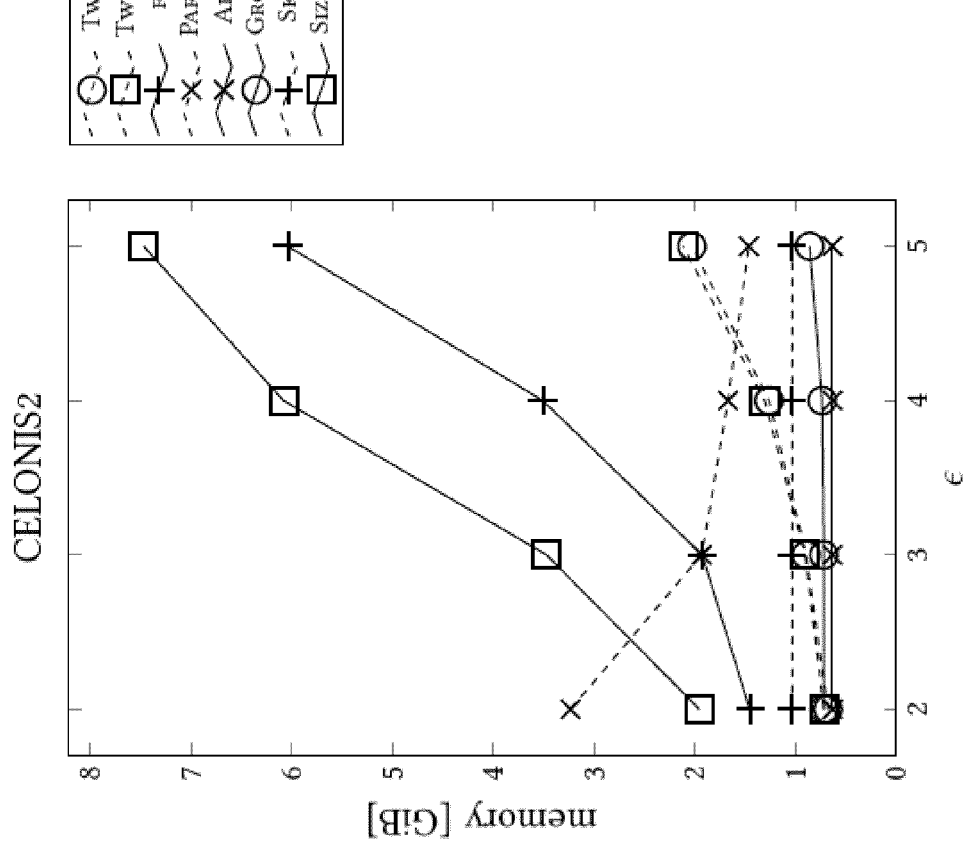

FIG. 4 extends the comparison of the methods of FIG. 3 on the datasets CELONIS2 and LIVEJ to the memory usage.

For the CELONIS2 dataset, the memory usage of the two embodiments according to the invention increases with increasing threshold distance c. It turns out that the methods according to the invention are not the most memory efficient ones, in particular due to additional storage needed for the second data structures. However, the methods according to the invention also outperform certain other methods, in particular the fcLSH and the SizeAware methods which both need more than twice the amount of memory as compared with the SingleSimple and the MultiReassessment approaches. In particular for a small threshold distance c the memory usage of the methods according to the invention is comparable with the memory usage of methods for the set similarity join problem from prior art.

For the LIVEJ dataset, the memory usage of the two embodiments of the invention is rather constant with increasing threshold distance c. Compared with their peers the memory usage of the two embodiments of the invention are located at the lower end of the spectrum, clearly outperforming the fcLSH method, the PartAlloc method and also the SizeAware method.

In practice, the improvement on the runtime efficiency is particularly valuable, whereas any minor increase on the memory usage often can be safely neglected. It is noteworthy, though, that the embodiments of the invention yet outperform the methods tailored to the HSJ setting in terms of memory usage.

In summary, the inventors demonstrated that reindexing selected inverted lists of the first index into at least one second index results in a much-improved runtime efficiency over datasets exhibiting different characteristics in comparison to known methods for the set similarity join problem. Sometimes even the memory usage is improved in comparison to known methods of the set similarity join problem. Details on how the subset of the first index is further processed, in particular merged, prior to reindexing appear to impose only minor effect on the observed runtime efficiency and/or memory usage.

We claim:

1. A computer-implemented method of determining at least one similar set to a selected query set (Q) within a collection of sets, wherein each set (R) comprises a number of tokens,
    wherein each set (R) represents a process and each token represents a process step, wherein the process comprises a series of process steps executed in at least one source computer system,
    wherein the method comprises the following steps:
    a) determining, by at least one computer processor, a first signature for each set (R),
    b) indexing, by at least one computer processor, each set (R) based on the determined first signature, wherein each indexed set (I) is stored, by at least one computer processor, in at least one first record, wherein each of the at least one first record is recorded, by at least one computer processor, in a first data structure representing a first index and corresponds to the determined first signature,
    c) selecting, by at least one computer processor, a subset of the first data structure based on a predefined cost function,
    d) for each first record of the selected subset of the first data structure, determining, by at least one computer processor, a second signature for each indexed set (I),
    e) reindexing, by at least one computer processor, the indexed set (I) based on the determined second signature, wherein each reindexed indexed set (I2) is stored, by at least one computer processor, in at least one second record, wherein each of the at least one second record is recorded, by at least one computer processor, in a second data structure representing at least one second index and corresponds to the determined second signature,
    f) generating, by at least one computer processor, a hybrid index from the complement of the selected subset of the first index and the at least one second index, and
    g) probing, by at least one computer processor, at least a subset of the hybrid index by computing, by at least one computer processor, a distance value between each set (I; I2) of each record of the subset and the selected query set (Q), wherein a probed set (C) is identified, by at least one computer processor, as one of the at least one similar set if the distance value is smaller or equal to a predefined threshold value,
    wherein the at least one similar set represents at least one similar process to a selected process within a collection of processes.

2. The method of claim 1, wherein the first record of the first data structure is a first linked list and/or the second record of the second data structure is a second linked list.

3. The method of claim 1, wherein the first signature comprises a first prefix, wherein the first prefix comprises at least one token of the corresponding set up to a predefined number of tokens, wherein the predefined number of tokens in the first prefix is computed, by at least one computer processor, based on the predefined distance function and the threshold value.

4. The method of claim 1, wherein the method is repeated, wherein in each repetition a different set (R) of the collection of sets is the selected query set (Q), until all sets (R) of the collection of sets are processed.

5. The method of claim 1, wherein in step c), the selected subset of the at least one first record is removed from the first index, wherein preferably a corresponding memory space is deallocated.

6. The method of claim 1, wherein in step c), computing, by at least one computer processor, the predefined cost function for each of the at least one first record independently.

7. The method of claim 6, wherein the predefined cost function contrasts a first cost of probing the indexed sets (I) of one of the at least one first record using the predefined distance function and a second cost of generating the second signatures for the indexed sets (I), reindexing the indexed sets (I) into the corresponding at least one second record and probing the reindexed indexed sets (I2) of the at least one second record, and wherein a first record is selected into the subset if the first cost exceeds the second cost.

8. The method of claim 7, wherein the indexed sets (I) of the at least one first record are sorted in decreasing order of the difference between the first cost and the second cost.

9. The method of claim 8, wherein in step d) the selected subset of the first data structure is merged before determining the second signature for each indexed set (I) using any of a group of heuristic methods, the group consisting of:
    merging each first record into a common record,
    processing each first record separately,
    merging each first record into the common record based on a predefined criteria, wherein a first record which fails the predefined criteria is skipped,
    merging each first record into at least one merged record based on the predefined criteria, wherein each skipped first record is stored and reassessed in subsequent processing, or
    combinations thereof.

10. The method of claim 1, wherein in step g) the sets (I; I2) of each record of the subset of the hybrid index are processed with increasing number of tokens.

11. The method of claim 10, wherein in step g) a predefined length filter is applied according to which each set (R) having a token of its first signature matching a token of the first signature determined for the selected query set (Q) is skipped if the matching token is located at a position in the set (R) from which less tokens remain than a predefined lower bound, wherein the predefined lower bound is determined from the predefined threshold value, the size of the selected query set (Q) and the position of the matching token in the set (R).

12. The method of claim 11, wherein the predefined cost function is based on the predefined length filter, wherein the first signature further comprises the position of the matching token in the set (R) and the number of tokens of the set (R).

13. The method of claim 1, wherein the first index and the second index are determined using complementary methods, preferably AllPairs and FastCoveringLSH.

14. The method of claim 1, wherein the predefined distance function determines the Hamming distance.

\* \* \* \* \*